US007433725B2

(12) United States Patent
Lin et al.

(10) Patent No.: US 7,433,725 B2
(45) Date of Patent: Oct. 7, 2008

(54) DUAL PURPOSE MULTI-BRAND MONOPOLE ANTENNA

(75) Inventors: Chia-I Lin, Hsintien (TW); Yun-Ta Chen, Hsintien (TW); Jui-Hung Hsu, Hsintien (TW); Yen-Liang Kuo, Hsintien (TW)

(73) Assignee: High Tech Computer Corp., Taoyuan Hsien (TW)

( * ) Notice: Subject to any disclaimer, the term of this patent is extended or adjusted under 35 U.S.C. 154(b) by 539 days.

(21) Appl. No.: 11/148,248

(22) Filed: Jun. 9, 2005

(65) Prior Publication Data

US 2006/0211373 A1 Sep. 21, 2006

(30) Foreign Application Priority Data

Mar. 15, 2005 (TW) .............................. 94107942 A

(51) Int. Cl.
*H04M 1/00* (2006.01)

(52) U.S. Cl. .............. 455/575.7; 455/562.1; 455/277.2; 455/575.1; 455/575.3; 455/63.1; 343/872; 343/700 MS; 343/725; 343/829

(58) Field of Classification Search .............. 455/575.1, 455/575.3, 277.2, 63.1, 575.7, 343.1, 562.1; 343/729, 872, 829
See application file for complete search history.

(56) References Cited

U.S. PATENT DOCUMENTS

| | | | | |
|---|---|---|---|---|
| 6,388,626 | B1 * | 5/2002 | Gamalielsson et al. | 343/702 |
| 6,396,444 | B1 * | 5/2002 | Goward et al. | 343/702 |
| 6,456,249 | B1 * | 9/2002 | Johnson et al. | 343/702 |
| 6,483,463 | B2 * | 11/2002 | Kadambi et al. | 343/700 MS |
| 6,505,054 | B1 | 1/2003 | Douglas et al. | |
| 6,518,932 | B1 * | 2/2003 | Matsui et al. | 343/770 |
| 6,538,604 | B1 * | 3/2003 | Isohatala et al. | 343/700 MS |
| 6,618,011 | B2 * | 9/2003 | Eggleston et al. | 343/700 MS |
| 6,646,606 | B2 * | 11/2003 | Mikkola et al. | 343/700 MS |
| 6,674,405 | B2 * | 1/2004 | Wang | 343/700 MS |
| 6,806,832 | B2 * | 10/2004 | Sato et al. | 343/700 MS |
| 6,822,620 | B2 * | 11/2004 | Watada et al. | 343/895 |
| 6,836,247 | B2 * | 12/2004 | Soutiaguine et al. | 343/700 MS |
| 6,903,691 | B2 * | 6/2005 | Sato et al. | 343/700 MS |
| 6,950,068 | B2 * | 9/2005 | Bordi et al. | 343/702 |
| 7,053,841 | B2 * | 5/2006 | Ponce De Leon et al. | 343/702 |
| 7,283,101 | B2 * | 10/2007 | Bisiules et al. | 343/727 |
| 2002/0089454 | A1 | 7/2002 | Eggleston et al. | |
| 2005/0128149 | A1 * | 6/2005 | Blom et al. | 343/702 |

FOREIGN PATENT DOCUMENTS

| | | | |
|---|---|---|---|
| EP | 1 313 165 | A2 | 5/2003 |
| EP | 1 478 047 | A1 | 11/2004 |
| WO | WO 03/067703 | A1 | 8/2003 |

* cited by examiner

*Primary Examiner*—Marceau Milord
(74) *Attorney, Agent, or Firm*—Rabin & Berdo, PC

(57) ABSTRACT

A monopole antenna apparatus with dual purposes of being a multi-band mobile phone and a global positioning system. The antenna is formed on a substrate, and the substrate comprises a flat surface, a cambered surface, a first radiating metal line, including one high-frequency resonant path and one low-frequency resonant path, a second radiating metal line, a first feeding point, and a second feeding point. The high-frequency resonant path and the low-frequency resonant path for receiving and transmitting the signals of the multi-band mobile phone system are formed on the flat surface and the cambered surface separately, and both are connected to the first feeding point. The second radiating metal line for receiving the signals of the global positioning system is formed on the cambered surface and is connected to the second feeding point.

33 Claims, 3 Drawing Sheets

DUAL PURPOSE MULTI-BRAND MONOPOLE ANTENNA

RELATED APPLICATIONS

The present application is based on, and claims priority from, Taiwan Application Serial Number 94107942, filed Mar. 15, 2005, the disclosure of which is hereby incorporated by reference herein in its entirety.

BACKGROUND

1. Field of Invention

The present invention relates to an antenna apparatus. More particularly, the present invention relates to a dual purpose antenna apparatus built in a wireless communication device for supporting the purposes of the multi-band mobile phone system and the global positioning system (GPS).

2. Description of Related Art

The key development in communication technology has been the transfer from wired to wireless communication, such as by the popularization of wireless household phones and mobile phones. In the field of wireless communication, the signal is propagated in the air in the form of electromagnetic waves, where the bridge of the signals between the wireless device and the air is an antenna. That is to say, an antenna is certainly needed by a wireless communication device to transmit or receive electromagnetic waves, and is therefore an essential component of a wireless communication device.

In the conventional wireless communication device, the antenna apparatus is usually attached to the exterior of the device, such as a helix antenna attached on the exterior of a mobile phone. A variety of problems are inherent to this arrangement, however. For example, such an antenna is easily damaged by external force, the overhead of the circuit design is increased and the device is harder to carry. Furthermore, in accordance with the present design trend, many functions are integrated into a device, such as a mobile phone being able to receive and transmit signals in various frequency bands and/or having GPS functionality. Thus, the amount of components and antennas will substantially increase in the device, but the limited volume of the device must be maintained. For these reasons, the external antenna is increasingly unsuited for using in advanced wireless communication devices.

It is apparent that the compact antenna built in wireless communication devices will be a mainstream trend in the communications field. The conventional embedded compact antenna techniques comprise the flexible printed circuit (FPC), but they have some problems. Due to the FPC antenna being a kind of flat antenna, the length of the resonant path is limited within a footprint and is unable to flexibly extend, thus restricting the operating bandwidth of the FPC antenna.

This restriction becomes a great impact in a clamshell type mobile phone. In general, a clamshell type mobile phone comprises a lower cover having a keypad and an upper cover having a display. Because the antenna of the clamshell type mobile phone is often located on the top of the lower cover and near the upper cover, the center frequency of the antenna may shift due to the influence of the circuit located in the upper cover. If the center frequency of the antenna shifts out of the operating bandwidth of the system, the antenna is unable to receive and process the signals from base stations.

Moreover, the distance between the circuits located in the upper cover and the antenna is not constant, due to the folding motion of the clamshell type mobile phone. That is to say, the frequency shift value caused by the circuit located in the upper cover is also not constant. For this reason, the frequency shift is hard to be compensated for the shortness of the bandwidth in advance in an FPC antenna. The frequency shift will be more significant at low frequency than at high frequency and thus increases the degree of difficulty in designing the FPC antenna.

According to the foregoing description, an embedded compact antenna apparatus which is able to tolerate the frequency shift phenomenon is needed to ensure a good receiver sensitivity of the mobile phone apparatus, especially applying in the clamshell type mobile phone.

SUMMARY

It is therefore an objective of the present invention to provide an embedded compact antenna apparatus.

It is another objective of the present invention to provide a compact antenna apparatus with low cost, which has stable performance and is easily integrated into a clamshell type mobile phone system.

It is still another objective of the present invention to provide a dual purpose compact antenna apparatus, which is able to receive and transmit the signals of the multi-band mobile phone and GPS system.

It is still another objective of the present invention to provide a three-dimensional compact antenna apparatus such that various resonant paths can be formed on the antenna to increase the operating bandwidth.

In accordance with the foregoing and other objectives of the present invention, the invention provides a substrate made by an insulating material, such as plastic, and the substrate has at least two surfaces. One of the two surfaces is a cambered surface and the other one is a flat surface. There are two separate signal feeding points on the antenna: a first feeding point and a second feeding point. The two feeding points may be respectively located on the cambered surface or the flat surface. Accordingly, there are two antenna resonant paths extending from the first feeding point, one being a high-frequency path of a first radiating metal line and the other being a low-frequency path of the first radiating metal line. The high-frequency path irregularly extends on the flat surface and the low-frequency path irregularly extends on the cambered surface. The total length of the high-frequency path is shorter than the total length of the low-frequency path. Furthermore, there is a second radiating metal line extending from the second feeding point formed on the cambered and the flat surfaces, and there is a shorting path extending from the second radiating metal line formed on the flat surface, wherein an end of the shorting path is used to connect with the ground potential of the system.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
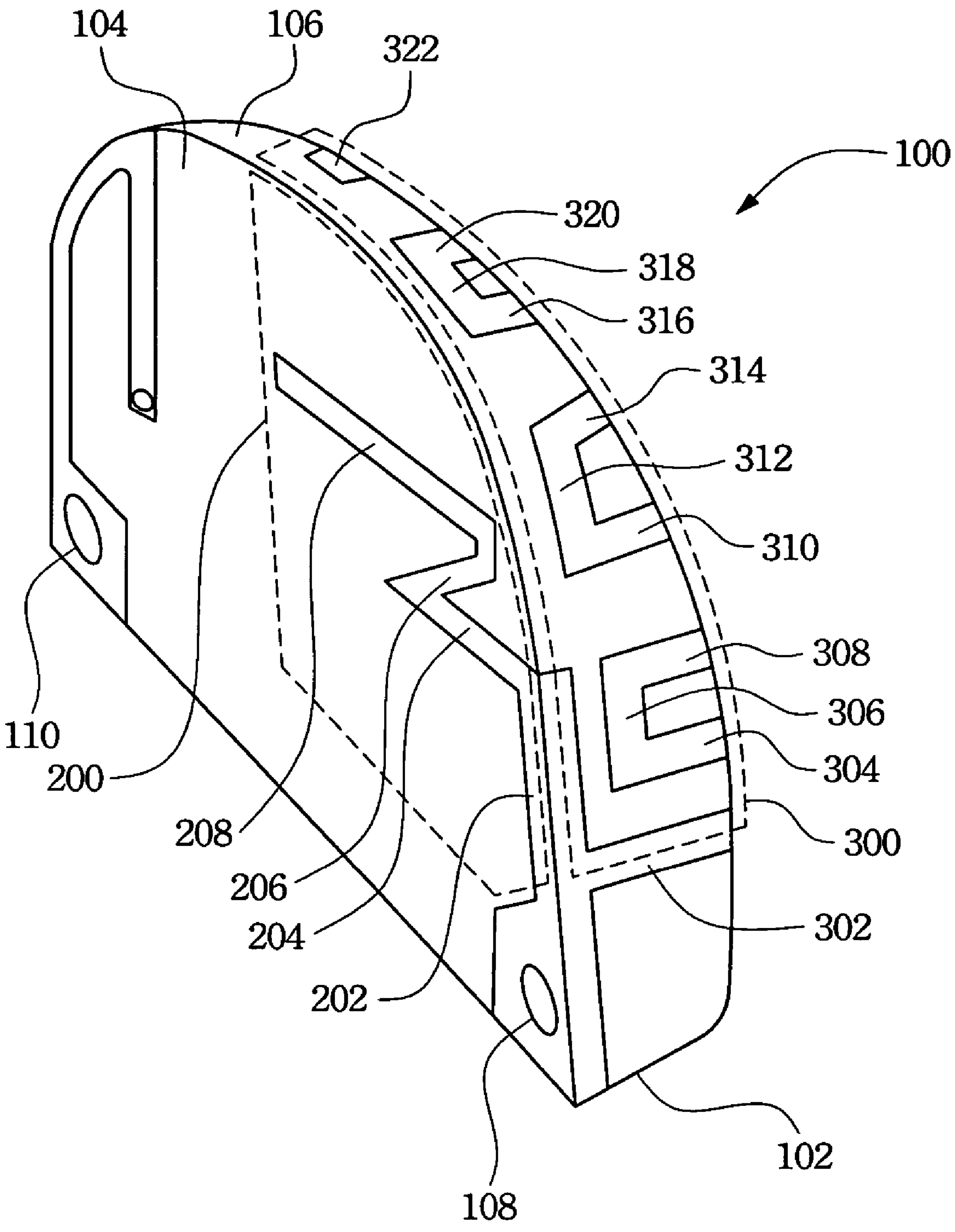
FIG. 1A is an oblique drawing of an antenna apparatus in accordance with an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The basic objective of the present invention is to provide an embedded compact antenna apparatus with the dual purposes of being a multi-band mobile phone and having a GPS. Especially in a clamshell mobile phone, the antenna is able to provide a wider operating bandwidth. Therefore, the basic concept of the present invention is to form two antenna radiators made of metal materials on an insulating substrate, such that the signals respectively processed by the two radiators will not interfere with each other. One of the two radiators is used to be an antenna resonant path of the multi-band mobile phone system, and the other one is used to be an antenna resonant path of the GPS. The resonant path of the multi-band mobile phone system is further divided into a high-frequency path for the high-frequency signals and a low-frequency path for the low-frequency signals. Because the low-frequency signals need a longer path to achieve a resonant state with lower frequency and in order to reduce the grounding effect caused by the circuit board located in the upper cover of the clamshell mobile phone, the low-frequency path is formed on a cambered surface of the substrate to achieve a larger surface area, thus enabling optimization of the antenna radiator structure.

Figure 1B:
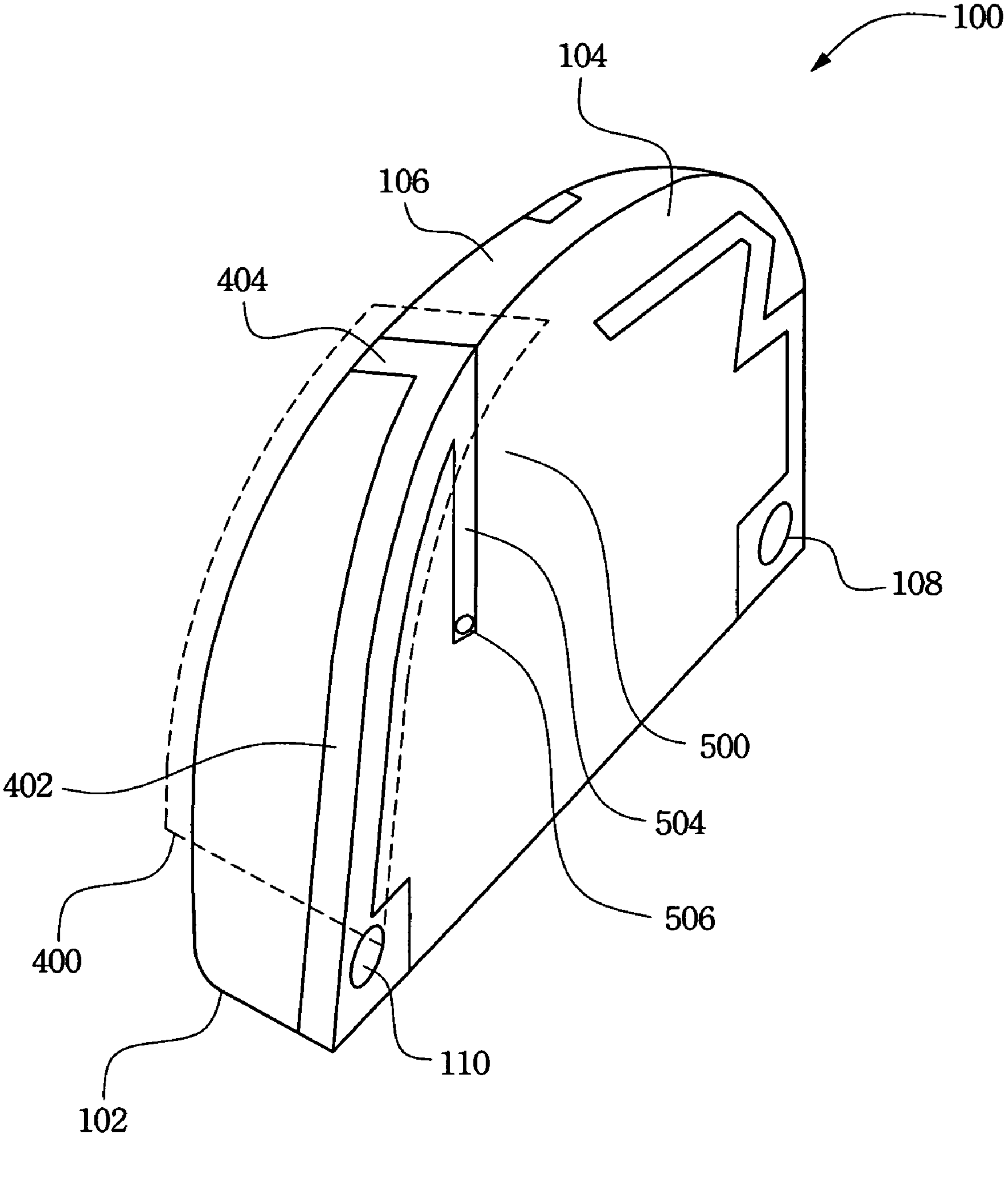
FIG. 1B is another oblique drawing of an antenna apparatus in accordance with an embodiment of the present invention.
Figure 1C:
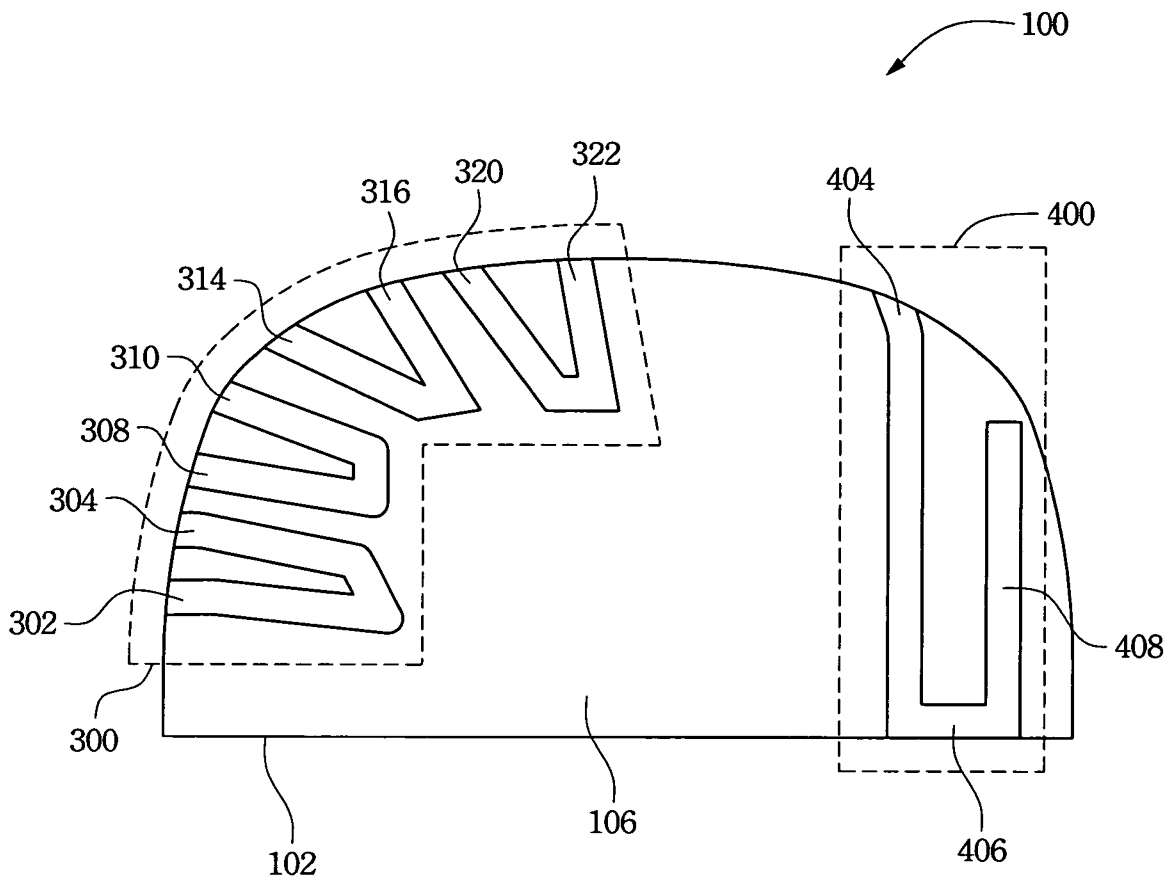
FIG. 1C is a front view of an antenna apparatus in accordance with an embodiment of the present invention

FIGS. 1A-1C all show an antenna apparatus 100 according to an embodiment of the present invention, wherein FIGS. 1A and 1B are the views of the antenna apparatus 100 from the left side and the right side separately, and FIG. 1C is a front view of the antenna apparatus 100.

Referring to FIG. 1A, a substrate 102 of the antenna apparatus 100 can be made of any insulating material, such as plastic, and at least has one flat surface 104 and one cambered surface 106. In the embodiment, a first feeding point 108 is located on the flat surface 104 and is used to connect with a mobile phone radio frequency (RF) module (not shown in the figure) so the RF signals can be received and transmitted by the antenna apparatus 100, but the location of the first feeding point 108 is not limited by the embodiment in practice.

Due to the antenna apparatus 100 being able to be used in a multi-band mobile phone system and the operating frequencies of the present mobile communication systems approximately comprising 800 MHz, 900 MHz, 1800 MHz and 1900 MHz, the first feeding point 108 is connected by two antenna resonant paths (or one first radiating metal line) made of metal materials for the four frequency bands. One of the two resonant paths is a high-frequency path 200 used by 1800 MHz and 1900 MHz bands, and the other is a low-frequency path 300 used by 800 MHz and 900 MHz bands. According to antenna theory, lower frequency EM waves need a longer antenna resonant path to be radiated; therefore, the high-frequency path 200 can be formed on the flat surface 104, and the low-frequency path 300 is formed on the cambered surface 106 because the low-frequency path 300 with a longer length needs a larger surface area to be formed to achieve a wider operating bandwidth. In the embodiment, the high-frequency path 200 is designed to process signals with a frequency range of 1710 MHz to 1990 MHz, and the low-frequency path 300 is designed to process signals with a frequency range of 824 MHz to 960 MHz. In these frequency ranges, almost all of the frequency bands used by the conventional mobile communication systems can be covered.

Referring to FIG. 1B, there is a second feeding point 110 located on the flat surface 104 acting as an entrance for the GPS signals to the antenna apparatus 100. In the embodiment, the second feeding point 110 is used to connect with a GPS RF module (not shown in the figure) for GPS signals to be received by the antenna apparatus 100 and is located on the flat surface 104, but the location of the second feeding point is not limited by the embodiment in practice.

The main purpose of the second feeding point 110 is to connect with a second radiating metal line 400. The operating frequency of the present GPS is about 1575 MHz; therefore, the length of the second radiating metal line 400 will be a little longer than the length of the high-frequency path 200 shown in FIG. 1A. Thus, the second radiating metal line 400 can be formed on the cambered surface 106 for avoiding an over-routing density on the flat surface 104. In addition, a shorting path 500 may be formed to connect to the second radiating metal line 400, and it includes a shorting point 506 to avoid degrading the stability of the GPS signals by the high-frequency path 200 or low-frequency path 300 when they are operated at the same time. The stability of the GPS signals can be enhanced in the operation when the shorting point 506 is connected with the ground potential of the system. Similarly, the shorting point 506 is located on the flat surface 104 in the embodiment, but the location of the shorting point 506 is not limited by the embodiment in practice.

The forms of each resonant path of the antenna apparatus 100, that is, the high-frequency path 200, low-frequency path 300, the second radiating metal line 400 and the shorting path 500 are not limited in the embodiment. But according to the results of the related experiments, the forms of each resonant path in the following description are able to provide a better performance (i.e. a better gain and bandwidth).

Referring to FIG. 1A again, it can be seen that the high-frequency path 200 is formed by connecting four line segments in order that extend from the first feeding point 108: a line segment 202, a line segment 204, a line segment 206 and a line segment 208. The angle between the line segment 202 and the line segment 204 is about 90° to 120°, and the adjacent angles among the line segments 204, 206, and 208 are both about 45° to 60°.

Referring to FIGS. 1A and 1C, it can be seen that the low-frequency path 300 is formed by connecting eleven line segments in order that extend from the first feeding point 108: a line segment 302, a line segment 304, a line segment 306, a line segment 308, a line segment 310, a line segment 312, a line segment 314, a line segment 316, a line segment 318, a line segment 320 and a line segment 322. The angles between the line segment 302 and the line segment 304, between the line segment 304 and the line segment 306, between the line segment 306 and the line segment 308, between the line segment 308 and the line segment 310, between the line segment 310 and the line segment 312, between the line segment 312 and the line segment 314, between the line segment 314 and the line segment 316, between the line segment 316 and the line segment 318, between the line segment 318 and the line segment 320 and between the line segment 320 and the line segment 322 are all about 30° to 120°.

Referring to FIGS. 1B and 1C, it can be seen that the second radiating metal line 400 is formed by connecting four line segments in order that extend from the second feeding point 110: a line segment 402, a line segment 404, a line segment 406 and a line segment 408. The angle between the line segment 402 and the line segment 404 is about 60°, and the adjacent angles among the line segment 404, 406, and 408 are both about 90°.

Referring to FIG. 1B, there is a shorting path 500 extending from the joint of the line segment 402 and the line segment 404 to a shorting point 506.

The material of the antenna apparatus 100 according to the embodiment is also discussed herein. The material of the substrate 102 is polycarbonate (PC), due to PC being easily shaped and thus beneficial to mass production. However, metal materials can't be easily attached to PC; therefore, all the paths on the substrate 102 surface, the high-frequency path 200, low-frequency path 300, the second radiating metal line 400 and the shorting path 500 should be formed by acrylonitrile butadiene styrene (ABS), due to metal materials being easily attached to ABS. Finally, all the paths on the substrate 102 are coated with any metal material for completing the antenna apparatus according to the embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A monopole antenna apparatus used with a communication system, comprising:
- a substrate, wherein said substrate comprises a flat surface and a cambered surface;
- a first feeding point located on said substrate, wherein said first feeding point is used to connect with said communication system;
- a first radiating metal line, comprising:
  - a high-frequency path formed on said flat surface, wherein one end of said high-frequency path is connected with said first feeding point;
  - a low-frequency path formed on said cambered surface, wherein one end of said low-frequency path is connected with said first feeding point;
- a second feeding point formed on said substrate, wherein said second feeding point is used to connect with said communication system; and
- a second radiating metal line formed on said cambered surface, wherein one end of said second radiating metal line is connected with said second feeding point.

2. The antenna apparatus of claim 1, further comprising:
- a shorting point formed on said substrate, wherein said shorting point is used to connect with a ground potential of said communicating system; and
- a shorting path formed on said flat surface, wherein the two ends of said shorting path are respectively connected with said second radiating metal line and said shorting point.

3. The antenna apparatus of claim 2, wherein said shorting path is a single line segment.

4. The antenna apparatus of claim 1, wherein the material of said substrate is plastic.

5. The antenna apparatus of claim 1, wherein the materials of said high-frequency path and said low-frequency path of said first radiating metal line, said second radiating metal line and said shorting path are metal.

6. The antenna apparatus of claim 1, wherein the resonant frequency band of said high-frequency path is 1710 MHz to 1990 MHz.

7. The antenna apparatus of claim 1, wherein the resonant frequency band of said low-frequency path is 824 MHz to 960 MHz.

8. The antenna apparatus of claim 1, wherein the resonant frequency of said second radiating metal line is 1575 MHz.

9. The antenna apparatus of claim 1, wherein said high-frequency path is formed by connecting four line segments in order, that is, a first line segment, a second line segment, a third line segment and a fourth line segment, wherein the angle between said first line segment and said second line segment is about 90° to 120°, and the adjacent angles among said second line segment, said third line segment, and said fourth line segment are both about 45° to 60°.

10. The antenna apparatus of claim 1, wherein said low-frequency path is formed by connecting eleven line segments in order, and the angles between any two adjacent line segments within said eleven line segments are all about 30° to 120°.

11. The antenna apparatus of claim 1, wherein said second radiating metal line is formed by connecting four line segments, that is, a first line segment, a second line segment, a third line segment and a fourth line segment, wherein the angle between said first line segment and said second line segment is about 60°, and the adjacent angles among said second line segment, said third line segment, and said fourth line segment are both about 90°.

12. A multi-band mobile phone and global positioning dual purpose system, comprising:
- a mobile phone radio frequency (RF) module, wherein said mobile phone RF module is used to transmit or receive the mobile phone signals of said system;
- a global positioning radio frequency (RF) module, wherein said global positioning RE module is used to receive the global positioning signals of said system;
- an antenna apparatus, comprising:
  - a substrate, wherein said substrate comprises a flat surface and a cambered surface;
  - a first feeding point located on said substrate, wherein said first feeding point is used to connect with said mobile phone RF module;
  - a first radiating metal line, comprising:
  - a high-frequency path formed on said flat surface, wherein one end of said high-frequency path is connected with said first feeding point;
  - a low-frequency path formed on said cambered surface, wherein one end of said low-frequency path is connected with said first feeding point;
  - a second feeding point formed on said substrate, wherein said second feeding point is used to connect with said global positioning RF module; and
  - a second radiating metal line formed on said cambered surface, wherein one end of said second radiating metal line is connected with said second feeding point.

13. The system of claim 12, further comprising:
- a shorting point formed on said substrate, wherein said shorting point is used to connect with a ground potential of said system; and
- a shorting path formed on said flat surface, wherein the two ends of said shorting path are respectively connected with said second radiating metal line and said shorting point.

14. The system of claim 13, wherein said shorting path is a single line segment.

15. The system of claim 12, wherein the material of said substrate is plastic.

16. The, system of claim 12, wherein the materials of said high-frequency path and said low-frequency path of said first radiating metal line, said second radiating metal line and said shorting path are metal.

17. The system of claim 12, wherein the resonant frequency band of said high-frequency path is 1710 MHz to 1990 MHz.

18. The system of claim 12, wherein the resonant frequency band of said low-frequency path is 824 MHz to 960 MHz.

19. The system of claim 12, wherein the resonant frequency of said second radiating metal line is 1575 MHz.

20. The system of claim 12, wherein said high-frequency path is formed by connecting four line segments in order, that is, a first line segment, a second line segment, a third line segment and a fourth line segment, wherein the angle between said first line segment and said second line segment is about 90° to 120°, and the adjacent angles among said second line segment, said third line segment, and said fourth line segment are both about 45° to 60°.

21. The system of claim 12, wherein said low-frequency path is formed by connecting eleven line segments in order, and the angles between any two adjacent line segments within said eleven line segments are all about 30° to 120°.

22. The system of claim 12, wherein said second radiating metal line is formed by connecting four line segments, that is, a first line segment, a second line segment, a third line segment and a fourth line segment, wherein the angle between said first line segment and said second line segment is about 60°, and the adjacent angles among said second line segment, said third line segment, and said fourth line segment are both about 90°.

23. The system of claim 12, wherein the shape of said system is clamshell type.

24. A method for manufacturing an antenna apparatus, comprising:

providing a substrate, wherein the material of said substrate is an insulating material and said substrate at least comprises a flat surface and a cambered surface;

forming a high-frequency path on said flat surface;

forming a low-frequency path on said cambered surface;

forming a second radiating line on said cambered surface;

forming a shorting path on said flat surface; and coating a metal materials on said high-frequency path, said low-frequency path, said second radiating line and said shorting path.

25. The method of claim 24, wherein the material of said substrate is plastic.

26. The method of claim 25, wherein the material of said substrate is polycarbonate (PC).

27. The method of claim 24, wherein the material of said high-frequency path, said low-frequency path, said second radiating line and said shorting path is acrylonitrile butadiene styrene (ABS).

28. The method of claim 24, wherein the resonant frequency band of said high-frequency path is 1710 MHz to 1990 MHz.

29. The method of claim 28, wherein said high-frequency path is formed by connecting four line segments in order, that is, a first line segment, a second line segment, a third line segment and a fourth line segment, wherein the angle between said first line segment and said second line segment is about 90 ° to 120°, and the adjacent angles among said second line segment, said third line segment, and said fourth line segment are both about 45° to 60°.

30. The method of claim 24, wherein the resonant frequency band of said low-frequency path is 824 MHz to 960 MHz.

31. The method of claim 30, wherein said low-frequency path is formed by connecting eleven line segments in order, and the angles between any two adjacent line segments within said eleven line segments are all about 30° to 120°.

32. The method of claim 24, wherein the resonant frequency of said second radiating line is 1575 MHz.

33. The method of claim 32, wherein said second radiating line is formed by connecting four line segments, that is, a first line segment, a second line segment, a third line segment and a fourth line segment, wherein the angle between said first line segment and said second line segment is about 60°, and the adjacent angles among said second line segment, said third line segment, and said fourth line segment are both about 90°.

* * * * *